United States Patent [19]

LaMott et al.

[11] Patent Number: 5,133,201
[45] Date of Patent: Jul. 28, 1992

[54] VEHICLE WHEEL LOCKING ASSEMBLY

[76] Inventors: Darryl L. LaMott, 1330 Goswell, Channelview, Tex. 77530; David R. Lee, Rte. 1, Box 96, Lake Norden, S. Dak. 57248

[21] Appl. No.: 646,174

[22] Filed: Jan. 28, 1991

[51] Int. Cl.$^5$ .............................................. B60R 25/08
[52] U.S. Cl. ........................................ 70/226; 188/265
[58] Field of Search ................ 70/225, 228, 226, 256, 70/257; 188/265, 82.7, 218 R, 218 XL

[56] References Cited

U.S. PATENT DOCUMENTS

| | | | |
|---|---|---|---|
| 1,158,891 | 11/1915 | Braun | 70/226 |
| 1,428,236 | 9/1922 | Jones | 70/226 |
| 2,009,862 | 7/1935 | Spell | 188/31 |
| 3,105,292 | 10/1963 | Jeune | 188/218 R |
| 3,147,828 | 9/1964 | Hunsaker | 188/218 R |
| 4,034,824 | 7/1977 | Lucas | 70/226 |
| 4,102,443 | 7/1978 | Kohler et al. | 188/218 XL |
| 4,930,606 | 6/1990 | Sporzynski et al. | 188/218 XL |

*Primary Examiner*—Gary L. Smith
*Assistant Examiner*—Darnell Boucher
*Attorney, Agent, or Firm*—Jackson & Walker

[57] ABSTRACT

A locking assembly is provided for vehicle wheels, such as those found on an automobile. A control cable is hand manipulated from the interior of the vehicle to permit a bias element on a locking stud to extend through one of a series of circumferentially defined locking holes through a holding plate adjacent the wheel to selectively lock the wheel in place.

12 Claims, 3 Drawing Sheets

VEHICLE WHEEL LOCKING ASSEMBLY

BACKGROUND OF THE INVENTION

(1) FIELD OF THE INVENTION

The invention relates to a locking assembly for one or more wheels of a vehicle.

(2) BRIEF DESCRIPTION OF THE PRIOR ART

There are numerous electrical and mechanical devices which are known for application on a wheeled vehicle, such as an automobile, a bus, a truck, and the like, in order to lock the wheels against normal rotational operation, and to thereby prevent theft of the vehicle.

A prior art search has developed the following prior art pertaining to the general subject of the invention, as follows:

| U.S. PAT. NO. | PATENTEE |
| --- | --- |
| 1,158,891 | Braun |
| 1,428,236 | Jones |
| 2,009,862 | Spell |
| 2,966,244 | Schreyer |
| 4,034,824 | Lucas |
| 4,622,833 | Shepherd |

The present invention addresses the problems of the prior art, as above reflected.

SUMMARY OF THE INVENTION

The present invention provides a vehicle wheel locking assembly, with embodiments for both wheels having disc and those having drum braking systems. The invention is incorporated in a vehicular wheel assembly which includes an axle. In instances in which the invention is incorporated into such a wheel assembly, which also includes a disc braking system, a circumferentially extending mounting plate is disposed around the outboard end of the axle, with a series of wheel mounting studs secured within the plate and projecting therefrom. The braking system includes a brake rotor disc carried outward of the mounting plate and receiving the mounting studs therethrough and a wheel element for mounting of a tire therearound. The wheel, of course, will receive the mounting studs therethrough. The vehicle locking device of the present invention which is intended for use in such wheel assembly comprises a series of central axially offset circumferentially disposed locking lug receptacles disposed within the brake rotor disc. A locking lug assembly is carried on the mounting plate and includes a housing, and an elongate locking lug movably carried in the housing and having an end portion projectable out of the housing. An opening is provided through the housing for passage therethrough of the end portion of the locking lug, with the locking lug being selectively movable from a first retracted position within the housing to a second expanded position, whereby the end portion is extended through the opening and into engagement with the brake rotor disc through one of the locking lug receptacles, and the vehicle wheel is, accordingly, locked.

In embodiments in which a drum-type braking system is incorporated, an enlarged flange will be defined around the outboard-most end of the axle. A locking plate will be provided which is secured along one side of such plate and a series of wheel mounting studs will be secured within the plate and will project therefrom. A series of circumferentially extending locking lug receptacles will be disposed within the locking plate. A locking lug assembly will be carried by the brake drum and backing plate will include a locking lug housing. An elongate locking lug is movably carried in the locking lug housing and has an end portion projecting out of the locking lug housing. An opening will be defined through the locking lug housing for passage therethrough of the end portion of the locking lug, with the locking lug being selectively movable from a first retracted position within the housing to a second expanded position, whereby the end portion is extended through the opening and into engagement with the mounting plate through one of the locking lug receptacles to thereby lock the vehicular wheel.

The present invention is intended to be utilized with a number of vehicles, such as trailers, automobiles, buses, trucks, and the like.

The wheel locking assembly of the present invention may be activated by means of hand manipulation of a holding device which is affixed to an end of a control conduit extending to each of the locking lugs for the respective wheels. The device may be manually manipulated by a vehicle operator to permit a bias, such as a spring, in association with each of the locking lugs, to move such lugs into expanded position. Unlocking of the device may be accomplished by manipulating the handle to cause the control conduit to overcome such bias to permit the elongate locking lug to be moved to the retracted position within the locking lug housing. Preferably, such handle will be stored in its own secured locked compartment within the interior of the vehicle, such as in a glove box, or the like, and which may be openable by manipulation of a combination or other lock means on such handle housing.

DESCRIPTION OF THE PREFERRED EMBODIMENTS

Figure 1:
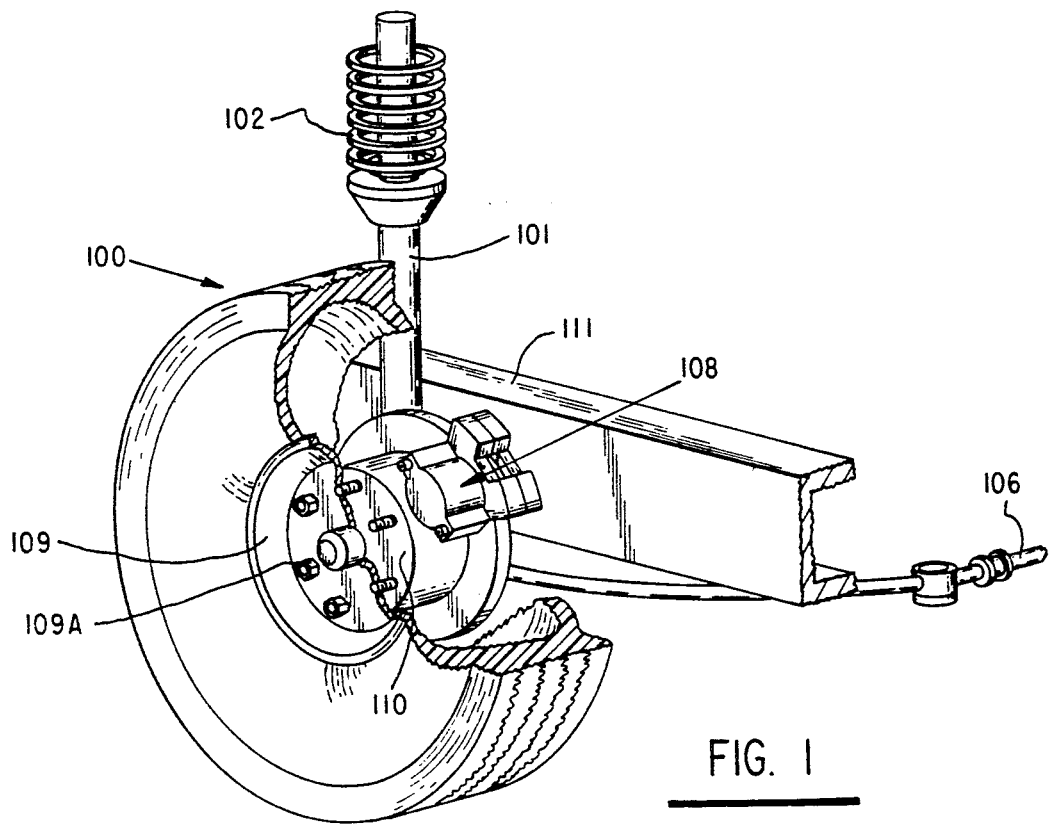
FIG. 1 is a schematic partial sectional illustration of a typical front axle configuration of an automobile incorporating a disc-type brake system.

Now referring to FIG. 1, there is shown a vehicle wheel assembly 100 consisting of a suspension unit 101, a rim 109 affixedly secured to a wheel hub 110 by means of bolts 109A. A coil spring 102 is schematically illustrated and is conventional in nature. A steering column (not shown) manipulates the wheel assembly 100 directionally between left and right driving configuration patterns and is mounted on a steering box (not shown). A drop arm (not shown) is associatedly secured to a track rod 106 for direct securement to the wheel hub 110 and is operatively secured relative to the drive system by means of a control arm (not shown). A disc brake assembly 108 is shown on a portion of the interiorly disposed, circularly extending portion of the wheel hub 110. The components shown in FIG. 1 form the front axle assembly 111.

Figure 2:
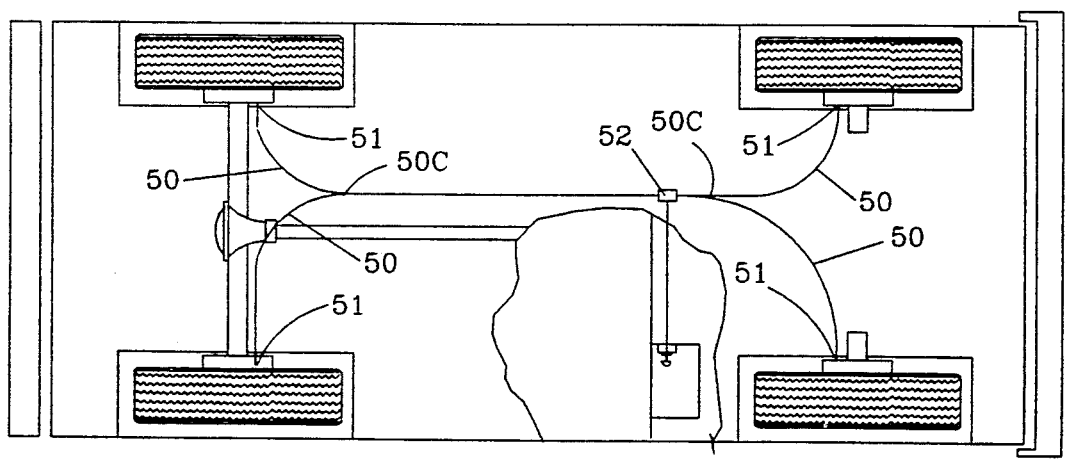
FIG. 2 is a schematic illustration looking toward the bottom of the exterior chassis of a vehicle illustrating the location of the lock assembly and the control conduit assembly for a plurality of wheels.

Now referring to FIG. 2, a locking lug housing 51 has a means therethrough for securement of the control conduit 50 which extends to a central branch portion 50C to a T box 52 which interengages similar control conduits 50 to other wheel assemblies.

Figure 4A:
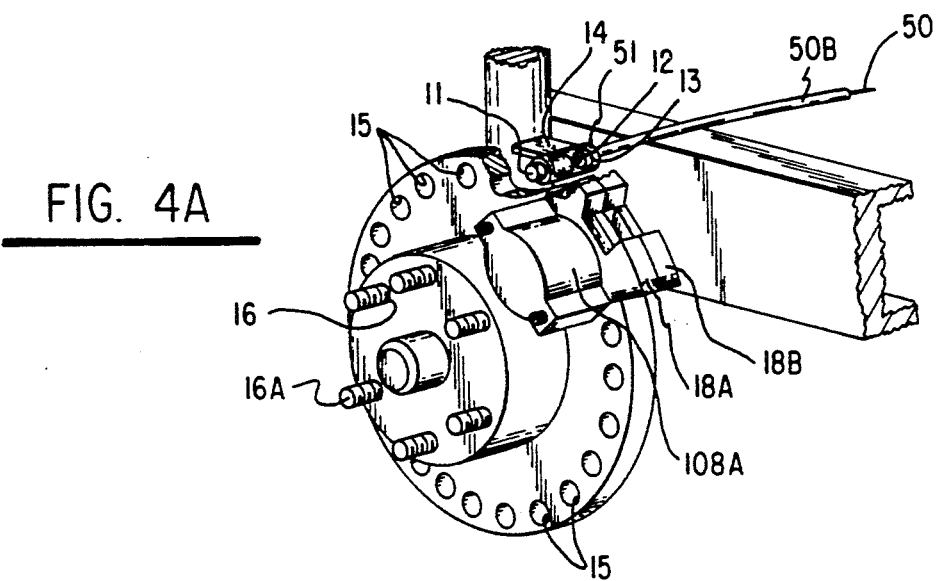
FIG. 4A is a partial sectional view of a vehicle wheel assembly with a rotor or disc-type brake assembly and incorporating the present invention. The locking lug is shown in unlocked position.
Figure 4B:
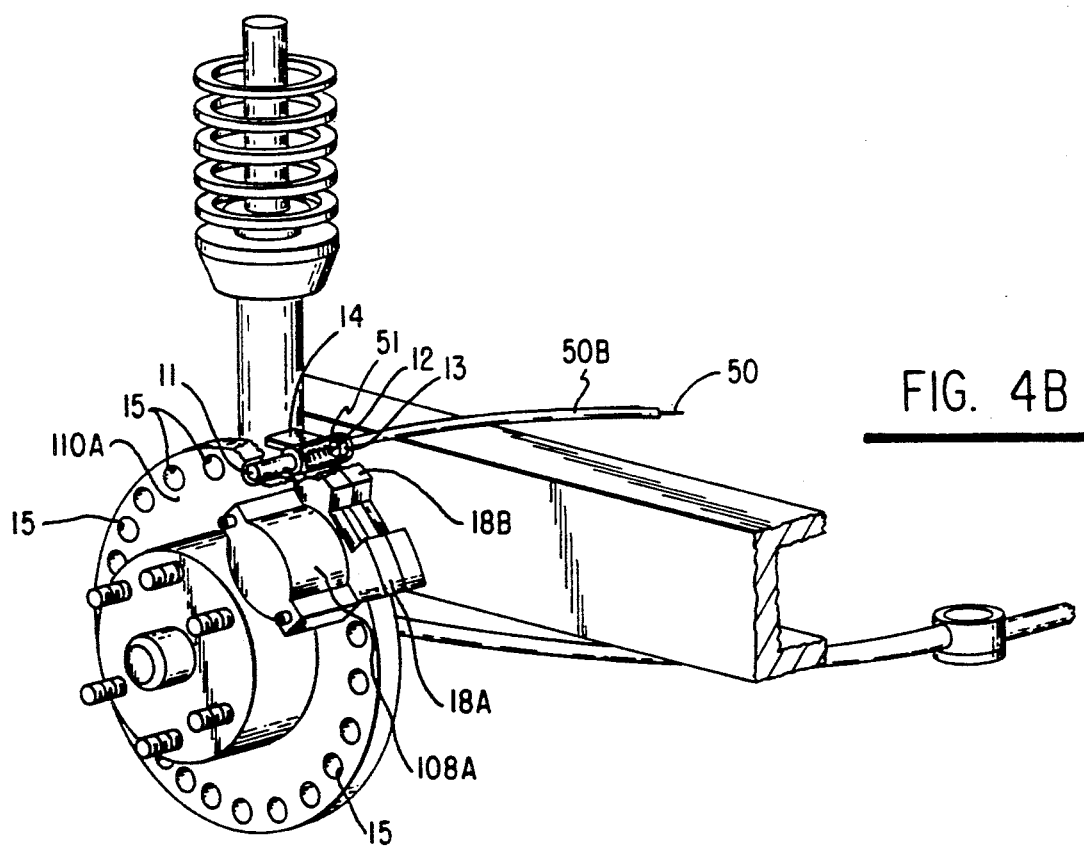
FIG. 4B is a view similar to that of FIG. 4A showing the locking assembly of the present invention in engagement to lock the wheel and move from the unlocked position as shown in FIG. 4A.

Now referring to FIGS. 4A and 4B, a rotor 110A has therearound on a portion a conventional brake caliper 108A and a series of flexibly mounted braking pads 18 and 18B. An inwardly extending outwardly protrudable locking lug 11 is contained within a housing 51 and is biased toward the locking outboard position by means of a locking lug spring 12 in conjunction with a locking lug spring stop 13. An actuating cable 50 extends to the inboard most end of the locking lug 11 to manipulate same between expanded and retracted positions and is encapsulated within an armored cable cover 50B. The housing is secured to the axle assembly 111 by means of a mounting tab 14.

The rotor 110A has a series of axially extending circumferentially spaced locking lug holes 15. Additionally, such rotor 110A also has a series of circumferentially extending more centrally located wheel stud holes 16 for securement therethrough of wheel studs 16A extending therethrough for mounting of the wheel.

Figure 3A:
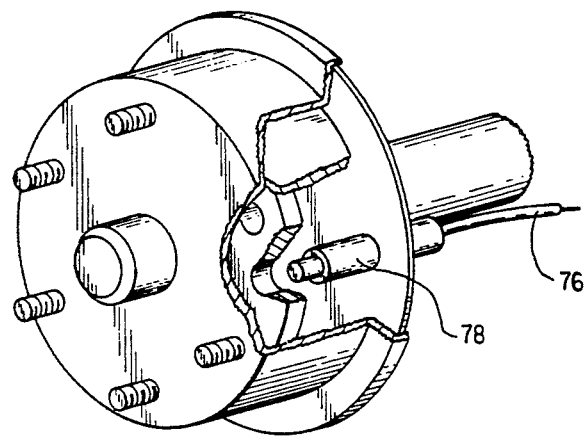
FIG. 3A is a partial sectional view of a vehicle wheel assembly illustrating the incorporation of the invention in a wheel assembly incorporating a drum-type assembly. The locking lug is shown in the unlocked position.
Figure 3:
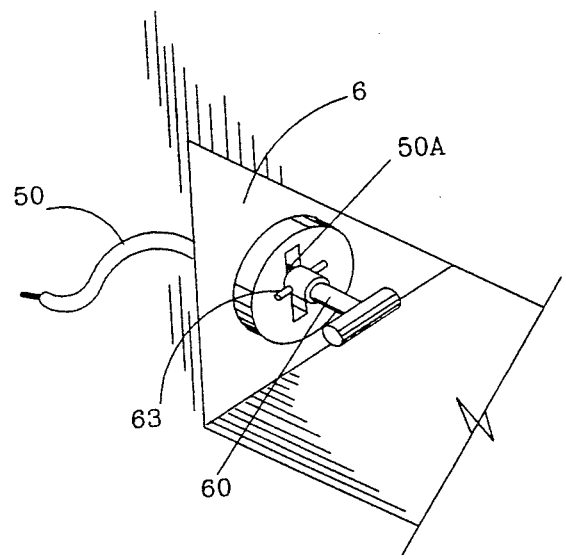
FIG. 3 is a schematic illustration of a partial vehicle interior illustrating the handle for the control conduit within a lockable housing therefor.

As shown in FIG. 4A, the actuating cable 50 is placed in position within the handle housing, shown in FIG. 3, such that the locking lug 11 is not in relative locking condition with respect to 10 the rotor 110A. However, when it is desired to move the locking lug 11 from the retracted position shown in FIG. 4A to the locked position shown in FIG. 4B, a handle 60 (FIG. 3) secured to the end 50A of the control cable 50 within a glove box 6 is manipulated out of a locking T 63 to permit the bias defined through the locking lug spring 12 to urge the locking lug 11 extendedly out of the housing 51 and into one of the locking lug holes 15. In the event that there is not sufficient alignment of one of the locking lug holes 15 to the end of the lug 11, the vehicle may be moved, just slightly, either forward or rearwardly, to so place one of the holes 15 in alignment with the lug 11. Accordingly, the device will be moved to the position as shown in FIG. 4B, and the vehicle wheel will be in locked condition.

Figure 3B:
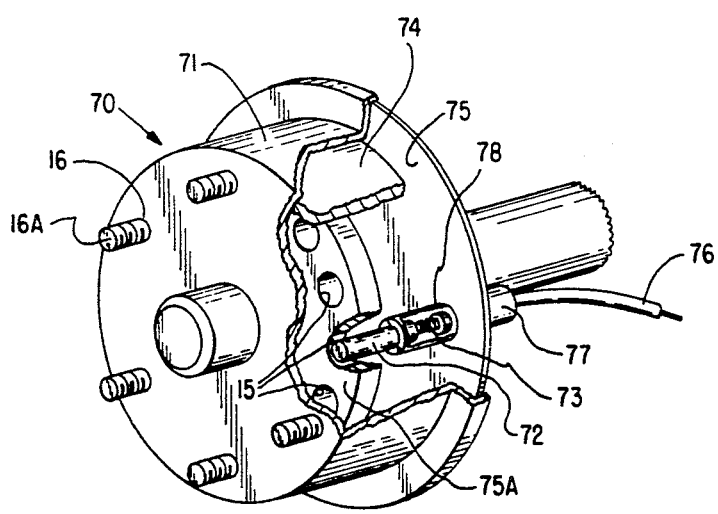
FIG. 3B is a view similar to that of FIG. 3A showing the locking lug moved from the unlocked to the locked position.

As shown in FIGS. 3A and 3B, a similar assembly is shown for drum-type application or assembly 70 having an assembly housing 71 with a locking lug housing 78 containing a locking lug 72 biased by a spring 73. A brake drum 74 is illustrated with a locking plate 75A, and an actuating cable 76 extending to the inboard most end of the locking lug 72 with a retainer screw 77 permitting securement of the housing 78 to the brake backing plate 75. The device is manipulated as shown in FIGS. 4A and 4B from the normal operating or retracted mode, FIG. 3A, to the locked mode, FIG. 3B.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a vehicle wheel assembly including an axle, a circumferentially extending mounting plate disposed around an outboard end of said axle, a series of wheel mounting studs secured within said mounting plate and projecting therefrom, a braking system including a brake rotor disc carried outboard of said mounting plate and receiving said mounting studs therethrough, and a wheel element for mounting a tire therearound, said wheel element receiving said mounting studs therethrough, the improvement of a vehicle wheel locking device comprising: a series of central axially offset, circumferentially disposed locking lug receptacles disposed within said brake rotor disc; a locking lug assembly carried on said mounting plate and including a housing; a elongate locking lug movably carried in said housing and having an end portion projectable out of said housing; an opening through said housing for passage therethrough of said end portion of said locking lug, said locking lug being selectively movable from a first protracted position within said housing to a second expanded position, whereby said end portion is extended through said opening and into engagement with said brake rotor disc through said one of said locking lug receptacles, and a vehicle wheel is locked.

2. The improvement of claim 1 further comprising biasing means for urging said locking lug to said expanded position.

3. The improvement of claim 2 wherein said biasing means is carried within said housing.

4. The improvement of claim 1, further comprising a flexible conduit extending from one end of said locking lug through said locking lug housing to a remote location on a vehicle.

5. The improvement of claim 4, said conduit further including a handle means at one end thereof for manual manipulation to overcome the bias of said biasing means to retract and move said locking lug to a position to permit the bias means to urge said locking lug into expanded position to lock said locking lug relative to said disc.

6. The improvement of claim 5 further comprising a housing for said handle means and a door thereon placed in locked condition relative to said housing and including locking means thereon.

7. In a vehicle wheel assembly including an axle; an enlarged flange defined on an outboard-most end of said axle, and a wheel the improvement comprising: a locking plate secured along one side of said axle; a series of wheel mounting studs secured within said plate and projecting therefrom; a series of circumferentially extending locking lug receptacles disposed within said locking plate; a brake drum including a backing plate; a locking lug assembly carried by said brake drum backing plate and including a locking lug housing; an elongate locking lug movably carried in said locking lug housing and having an end portion projecting out of said locking lug housing; an opening through said locking lug housing for passage therethrough of said end portion of said locking lug, said locking lug being selectively movable from a first retracted position within said housing to a second expanded position, whereby said end portion is extended through said opening and into engagement with said mounting plate through one of said locking lug receptacles, and said wheel is locked.

8. The improvement of claim 7 further comprising biasing means for urging of said locking lug in expanded position.

9. The improvement of claim 8 wherein said biasing means is carried in said locking lug housing.

10. The improvement of claim 7 further comprising flexible conduit means extending from one end of said locking lug through the locking lug housing to a location on a vehicle remote from said assembly.

11. The improvement of claim 10 wherein said conduit means further comprises handle means at one end thereof for manual manipulation of said conduit means to overcome the bias of said biasing means to retract said locking lug and further manipulatable to move said locking lug to a position to permit the bias to urge said locking lug into expanded position to lock said locking lug relative to said mounting plate.

12. The improvement of claim 11 further comprising a housing for said handle and a door thereon placed in locked condition relative to the housing and including locking means thereon.

* * * * *